United States Patent
Winokur

(10) Patent No.: US 9,021,124 B2
(45) Date of Patent: Apr. 28, 2015

(54) DISTRIBUTED INTELLIGENT NETWORK

(75) Inventor: Alex Winokur, Haifa (IL)

(73) Assignee: Axxana (Israel) Ltd., Tel Aviv (IL)

( * ) Notice: Subject to any disclaimer, the term of this patent is extended or adjusted under 35 U.S.C. 154(b) by 144 days.

(21) Appl. No.: 13/395,673

(22) PCT Filed: Nov. 25, 2010

(86) PCT No.: PCT/IB2010/055421
§ 371 (c)(1),
(2), (4) Date: Mar. 13, 2012

(87) PCT Pub. No.: WO2011/067702
PCT Pub. Date: Jun. 9, 2011

(65) Prior Publication Data
US 2013/0019001 A1      Jan. 17, 2013

Related U.S. Application Data

(60) Provisional application No. 61/265,766, filed on Dec. 2, 2009.

(51) Int. Cl.
*G06F 15/16* (2006.01)
*G06F 3/00* (2006.01)
(Continued)

(52) U.S. Cl.
CPC ........ *H04L 67/1097* (2013.01); *G06F 11/1616* (2013.01); *G06F 3/061* (2013.01); *G06F 3/0635* (2013.01); *G06F 3/067* (2013.01)

(58) Field of Classification Search
CPC ... H04L 67/1097; G06F 3/0635; G06F 3/061; G06F 11/1616

USPC ......... 370/389, 351, 224; 709/230, 220–223; 714/23; 710/29
See application file for complete search history.

(56) References Cited

U.S. PATENT DOCUMENTS 3,140,847 A    7/1964  Ames
5,027,104 A    6/1991  Reid
(Continued)

FOREIGN PATENT DOCUMENTS

EP    0420425 A2   4/1991
GB    2273180 A    6/1994
(Continued)

OTHER PUBLICATIONS

U.S. Appl. No. 13/151,289 Office Action dated Sep. 6, 2013.
(Continued)

*Primary Examiner* — Aftab Nasir Khan
(74) *Attorney, Agent, or Firm* — D Kligler I.P. Services Ltd.

(57) ABSTRACT

A network appliance (40) includes a processor (48) and a Host Bus Adapter (HBA-44). The processor is configured to execute storage commands in one or more storage devices (28A, 28B). The HBA is coupled to a network (32) so as to receive communication frames sent over the network to the network appliance, and is configured to filter the received communication frames so as to pass through to the processor only a subset of the received communication frames, which correspond to the storage commands that have been sent by one or more applications for processing by the network appliance.

16 Claims, 3 Drawing Sheets

(51) Int. Cl.
*H04L 29/08* (2006.01)
*G06F 11/16* (2006.01)
*G06F 3/06* (2006.01)

(56) References Cited

U.S. PATENT DOCUMENTS

| | | | |
|---|---|---|---|
| 5,546,533 A | 8/1996 | Koyama | |
| 5,594,900 A | 1/1997 | Cohn et al. | |
| 5,623,597 A | 4/1997 | Kikinis | |
| 5,680,579 A | 10/1997 | Young et al. | |
| 5,724,501 A | 3/1998 | Dewey et al. | |
| 5,799,141 A | 8/1998 | Galipeau et al. | |
| 5,841,768 A | 11/1998 | Ozluturk et al. | |
| 5,889,935 A | 3/1999 | Ofek et al. | |
| 6,105,078 A | 8/2000 | Crockett et al. | |
| 6,144,999 A | 11/2000 | Khalidi et al. | |
| 6,158,833 A | 12/2000 | Engler | |
| 6,173,377 B1 | 1/2001 | Yanai et al. | |
| 6,226,651 B1 | 5/2001 | Masuda et al. | |
| 6,260,125 B1 | 7/2001 | McDowell et al. | |
| 6,298,290 B1 | 10/2001 | Abe et al. | |
| 6,324,654 B1 | 11/2001 | Wahl et al. | |
| 6,389,552 B1 | 5/2002 | Hamilton et al. | |
| 6,400,730 B1* | 6/2002 | Latif et al. | 370/466 |
| 6,574,538 B2 | 6/2003 | Sasaki | |
| 6,580,450 B1 | 6/2003 | Kersting et al. | |
| 6,658,590 B1 | 12/2003 | Sicola et al. | |
| 6,684,306 B1 | 1/2004 | Nagasawa et al. | |
| 6,816,480 B1 | 11/2004 | Monroe et al. | |
| 6,842,825 B2 | 1/2005 | Geiner et al. | |
| 6,859,865 B2 | 2/2005 | De Margerie | |
| 6,954,875 B2 | 10/2005 | Liu | |
| 6,976,186 B1 | 12/2005 | Gardner | |
| 7,020,743 B2 | 3/2006 | Lee et al. | |
| 7,065,589 B2 | 6/2006 | Yamagami | |
| 7,111,189 B1 | 9/2006 | Sicola et al. | |
| 7,114,094 B2 | 9/2006 | Soejima | |
| 7,120,834 B1* | 10/2006 | Bishara | 714/43 |
| 7,148,802 B2 | 12/2006 | Abbruscato et al. | |
| 7,185,228 B2 | 2/2007 | Achiwa | |
| 7,188,292 B2 | 3/2007 | Cordina et al. | |
| 7,302,506 B2* | 11/2007 | Harima et al. | 710/104 |
| 7,383,405 B2 | 6/2008 | Vega et al. | |
| 7,386,376 B2 | 6/2008 | Basir et al. | |
| 7,451,355 B1 | 11/2008 | Coatney et al. | |
| 7,478,266 B2 | 1/2009 | Gatto et al. | |
| 7,487,311 B2 | 2/2009 | Stroberger et al. | |
| 7,548,560 B1* | 6/2009 | Dropps et al. | 370/470 |
| 7,577,724 B1* | 8/2009 | Jalagam et al. | 709/220 |
| 7,577,807 B2 | 8/2009 | Rowan et al. | |
| 7,668,177 B1* | 2/2010 | Trapp et al. | 370/395.42 |
| 7,707,460 B2 | 4/2010 | Hyde, II et al. | |
| 7,797,582 B1 | 9/2010 | Stager et al. | |
| 2001/0047412 A1 | 11/2001 | Weinman | |
| 2002/0162112 A1 | 10/2002 | Javed | |
| 2002/0176417 A1* | 11/2002 | Wu et al. | 370/389 |
| 2002/0188392 A1 | 12/2002 | Breed et al. | |
| 2003/0014523 A1 | 1/2003 | Teloh et al. | |
| 2003/0093541 A1* | 5/2003 | Lolayekar et al. | 709/230 |
| 2003/0097607 A1 | 5/2003 | Bessire | |
| 2003/0115324 A1* | 6/2003 | Blumenau et al. | 709/225 |
| 2003/0204597 A1 | 10/2003 | Arakawa et al. | |
| 2004/0012316 A1 | 1/2004 | Davis | |
| 2004/0030837 A1 | 2/2004 | Geiner et al. | |
| 2004/0044649 A1 | 3/2004 | Yamato et al. | |
| 2004/0044865 A1 | 3/2004 | Sicola et al. | |
| 2004/0059844 A1 | 3/2004 | Jones et al. | |
| 2004/0064639 A1 | 4/2004 | Sicola et al. | |
| 2004/0073831 A1 | 4/2004 | Yanai et al. | |
| 2004/0153717 A1 | 8/2004 | Duncan | |
| 2004/0193802 A1 | 9/2004 | Meiri et al. | |
| 2004/0230352 A1 | 11/2004 | Monroe | |
| 2004/0260873 A1 | 12/2004 | Watanabe | |
| 2005/0005001 A1 | 1/2005 | Hara et al. | |
| 2005/0015657 A1 | 1/2005 | Sugiura et al. | |
| 2005/0027892 A1 | 2/2005 | McCabe et al. | |
| 2005/0243609 A1 | 11/2005 | Yang et al. | |
| 2005/0280421 A1 | 12/2005 | Yomoda et al. | |
| 2006/0025897 A1 | 2/2006 | Shostak et al. | |
| 2006/0031468 A1 | 2/2006 | Atluri et al. | |
| 2006/0051157 A1 | 3/2006 | Bornstein et al. | |
| 2006/0072580 A1* | 4/2006 | Dropps et al. | 370/395.7 |
| 2006/0075148 A1 | 4/2006 | Osaki | |
| 2006/0274755 A1* | 12/2006 | Brewer et al. | 370/392 |
| 2006/0284214 A1 | 12/2006 | Chen | |
| 2007/0079088 A1 | 4/2007 | Deguchi et al. | |
| 2007/0083657 A1* | 4/2007 | Blumenau et al. | 709/226 |
| 2007/0094467 A1 | 4/2007 | Yamasaki | |
| 2007/0124789 A1 | 5/2007 | Sachson et al. | |
| 2007/0198613 A1 | 8/2007 | Prahlad et al. | |
| 2007/0266197 A1 | 11/2007 | Neyama et al. | |
| 2008/0001128 A1 | 1/2008 | Goldberg | |
| 2008/0004904 A1 | 1/2008 | Tran | |
| 2008/0061963 A1 | 3/2008 | Schnitz et al. | |
| 2008/0104443 A1 | 5/2008 | Akutsu et al. | |
| 2008/0177964 A1 | 7/2008 | Takahashi et al. | |
| 2008/0201390 A1 | 8/2008 | Anguelov | |
| 2008/0263363 A1 | 10/2008 | Jueneman et al. | |
| 2008/0297346 A1 | 12/2008 | Brackmann et al. | |
| 2009/0007192 A1 | 1/2009 | Singh | |
| 2009/0094425 A1 | 4/2009 | Winokur | |
| 2009/0216969 A1 | 8/2009 | Winokur | |
| 2009/0287967 A1 | 11/2009 | Winokur | |
| 2010/0169706 A1 | 7/2010 | Winokur | |
| 2010/0172084 A1 | 7/2010 | Winokur | |
| 2011/0026527 A1* | 2/2011 | Shao et al. | 370/392 |
| 2011/0231366 A1 | 9/2011 | Winokur | |
| 2011/0264954 A1 | 10/2011 | Winokur et al. | |
| 2012/0124311 A1 | 5/2012 | Winokur | |
| 2013/0016721 A1* | 1/2013 | Bill et al. | 370/390 |

FOREIGN PATENT DOCUMENTS

| | | |
|---|---|---|
| JP | H05-233413 | 9/1993 |
| JP | 2004164094 A | 6/2004 |
| JP | 200571068 A | 3/2005 |
| RU | 2128854 C1 | 4/1999 |
| RU | 2221177 C2 | 1/2004 |
| WO | 01/97030 A1 | 12/2001 |
| WO | 2005022292 A2 | 3/2005 |
| WO | 2006111958 A2 | 10/2006 |
| WO | 2008049703 A2 | 5/2008 |
| WO | 2010079447 A1 | 7/2010 |
| WO | 2011015970 A1 | 2/2011 |
| WO | 2011067702 A1 | 9/2011 |

OTHER PUBLICATIONS

U.S. Appl. No. 13/151,289 Office Action dated Nov. 19, 2013.
U.S. Appl. No. 13/132,921 Office Action dated Jun. 20, 2013.
U.S. Appl. No. 12/647,565 Official Action dated Jan. 23, 2012.
EP Patent Application # 11178916.0 Search Report dated Nov. 10, 2011.
EP Patent Application # 08789728.6 Search Report dated Jan. 16, 2012.
EP Patent Application # 09750209.0 Search Report dated Jan. 18, 2012.
U.S. Appl. No. 10/585,587 Official Action dated Dec. 7, 2009.
Nadporojski, G., "Review of GSM-telephone Benefon Twin+", published on http://www.ixbt.com, Jan. 9, 2001.
International Application No. PCT/IL2008/001052 Search Report dated Nov. 19, 2008.
Chinese Patent Application No. 200680017546.1 Official Action dated Dec. 26, 2008.
Goldfire Ltd., "Technology and Solutions Developed for Our Clients", Brussels, Belgium, 2009.
Firetrust, "FireTrust Technology", Brussels, Belgium, 2009.
International Application No. PCT/IL2006/000453 Search Report dated Mar. 9, 2007.
Russian Patent Application No. 2007141777 Official Action dated May 6, 2009.
U.S. Appl. No. 12/463,438 Official Action dated Mar. 4, 2011.

(56) References Cited

OTHER PUBLICATIONS

EP Application # 11150100.3 Partial Search Report dated Mar. 1, 2011.
EMC Corporation, "EMC SRDF Family: High-Performance remote replication for business continuity", USA (Sep. 6, 2006).
IBM Corporation, "Storage Solutions: Data Encryption within the Drive Itself", USA (Sep. 6, 2006).
U.S. Appl. No. 10/585,587 Official Action dated Aug. 20, 2009.
European Patent Application No. 06728254.1 Supplementary Search Report dated Aug. 19, 2009.
"Flexible Min-K: Product Information", Thermal Ceramics Inc., Jan. 2008.
European Patent Application No. 06728254.1 Official Action dated Sep. 3, 2009.
International Application PCT/IB2009/051919 Search Report dated Oct. 16, 2009.
U.S. Appl. No. 12/721,580 Official Action dated Sep. 28, 2010.
European Patent Application No. 06728254.1 Official Action dated Jan. 22, 2010.
International Application PCT/IB2010/050041 Search Report dated Jun. 8, 2010.
International Application PCT/IB2009/055961 Search Report dated Jun. 24, 2010.
European Patent Application No. 06728254.1 Summons to Attend Oral Proceedings dated Jun. 8, 2010.
Russian Patent Application # 2009126283 Official Action dated Sep. 7, 2010.
U.S. Appl. No. 12/228,315 Official Action dated Sep. 9, 2010.
ANSI/INCITS standard 269-1996, "Information Technology—SCSI-3 Fibre Channel Protocol (FCP)", American National Standards Institute (ANSI) and the International Committee for Information Technology Standards (INCITS), Apr. 8, 1996.
U.S. Appl. No. 12/721,580 Official Action dated Feb. 23, 2011.
International Application PCT/IB2010/053427 Search Report dated Dec. 27, 2010.
U.S. Appl. No. 12/228,315 Official Action dated Feb. 18, 2011.
Russian Patent Application No. 2009126283 Official Action dated Mar. 1, 2011.
Japanese Application # 2008-507263 Official Action dated Jul. 1, 2011.
U.S. Appl. No. 13/151,289 Office Action dated Jan. 17, 2013.
European Patent Application # 11150100.3 Extended Search Report dated Sep. 26, 2012.
Russian Patent Application # 2011117119 Office Action dated Sep. 10, 2012.
U.S. Appl. No. 13/151,289 Official Action dated Aug. 13, 2012.
U.S. Appl. No. 13/382,926 Office Action dated Jan. 31, 2014.

\* cited by examiner

DISTRIBUTED INTELLIGENT NETWORK

CROSS-REFERENCE TO RELATED APPLICATIONS

This application claims the benefit of U.S. Provisional Patent Application 61/265,766, filed Dec. 2, 2009, whose disclosure is incorporated herein by reference.

FIELD OF THE INVENTION

The present invention relates generally to computer networks, and particularly to methods and systems for processing storage commands in computer networks.

BACKGROUND OF THE INVENTION

Data storage systems use various network configurations and communication protocols for carrying out data storage operations. Some systems use Small Computer System Interface (SCSI) commands over a Fibre Channel (FC) protocol. SCSI and FC are specified, for example, by the American National Standards Institute (ANSI) and the International Committee for Information Technology Standards (INCITS) in ANSI/INCITS standard 269-1996, entitled "Information Technology—SCSI-3 Fibre Channel Protocol (FCP)," Apr. 8, 1996, which is incorporated herein by reference.

SUMMARY OF THE INVENTION

An embodiment of the present invention that is described herein provides a network appliance, including:

a processor, which is configured to execute storage commands in one or more storage devices; and a Host Bus Adapter (HBA), which is coupled to a network so as to receive communication frames sent over the network to the network appliance, and is configured to filter the received communication frames so as to pass through to the processor only a subset of the received communication frames, which correspond to the storage commands that have been sent by one or more applications for processing by the network appliance.

In some embodiments, the HBA is configured to filter the communication frames based on one or more attributes of the storage commands to which the communication frames belong. In some embodiments, the attributes of a storage command include at least one parameter selected from a group of parameters consisting of a type of the storage command and a storage volume to which the storage command is applied.

In an embodiment, each storage command is sent over the network in a respective sequence of the communication frames, and the HBA is configured to identify the respective sequence of the communication frames belonging to each storage command so as to reassemble the respective storage commands, and to filter the received communication frames by applying a filtering criterion to the reassembled storage commands. In an embodiment, the filtering criterion is defined over one or more attributes that are specified only in a first frame of each sequence of the communication frames, and the HBA is configured to identify the first frame of each sequence, to extract the attributes from the first frame, and to filter the communication frames based on the extracted attributes. In a disclosed embodiment, the processor is configured to accept the filtering criterion over a Command Line Interface (CLI) or Graphical User Interface (GUI), and to forward the filtering criterion to the HBA.

In an embodiment, the HBA is configured to receive the communication frames from a network switch, and to redirect back to the network switch the communication frames that are not passed through to the processor. The HBA may be configured to receive the communication frames over a given port, and to redirect the communication frames back to the network switch over the given port. Alternatively, the HBA may be configured to receive the communication frames over a first port, and to redirect the communication frames back to the network switch over a second port that is different from the first port. In another embodiment, the HBA is configured to discard the communication frames that are not passed through to the processor.

There is additionally provided, in accordance with an embodiment of the present invention, a storage network, including:

a network switch, which is configured to receive from one or more applications communication frames that convey storage commands for execution in one or more storage devices, and to forward the communication frames irrespective of the storage commands to which the frames belong; and a network appliance, including:
a processor, which is configured to execute the storage commands in the one or more storage devices; and
a Host Bus Adapter (HBA), which is configured to receive the communication frames sent from the network switch to the network appliance, and to filter the received communication frames so as to pass through to the processor only a subset of the received communication frames, which correspond to the storage commands that have been sent by the one or more applications for processing by the network appliance.

In some embodiments, the network switch is configured to redirect the communication frames to the network appliance. In an embodiment, the network switch is configured to duplicate the communication frames so as to produce first and second streams of the communication frames, to send the first stream for execution in one of the storage devices and to send the second stream to the network appliance for execution in another of the storage devices.

There is also provided, in accordance with an embodiment of the present invention, a storage method, including:

in a network appliance that includes a Host Bus Adapter (HBA) and a processor, receiving over a network communication frames for execution in one or more storage devices;

filtering the received communication frames in the HBA, so as to pass through to the processor only a subset of the received communication frames corresponding to the storage commands that have been sent by one or more applications for processing by the network appliance; and executing, using the processor, the storage commands that were passed through by the HBA.

There is further provided, in accordance with an embodiment of the present invention, a storage method, including:

in a network switch, receiving from one or more applications communication frames that convey storage commands for execution in one or more storage devices, and forwarding the communication frames irrespective of the storage commands to which the frames belong;

receiving the forwarded communication frames in a network appliance that includes a Host Bus Adapter (HBA) and a processor;

filtering the received communication frames in the HBA of the network appliance, so as to pass through to the processor only a subset of the received communication frames corresponding to the storage commands that have been sent by the one or more applications for processing by the network appliance; and executing, using the processor, the storage commands that were passed through by the HBA.

The present invention will be more fully understood from the following detailed description of the embodiments thereof, taken together with the drawings in which:

DETAILED DESCRIPTION OF EMBODIMENTS

Overview

Figure 1A:
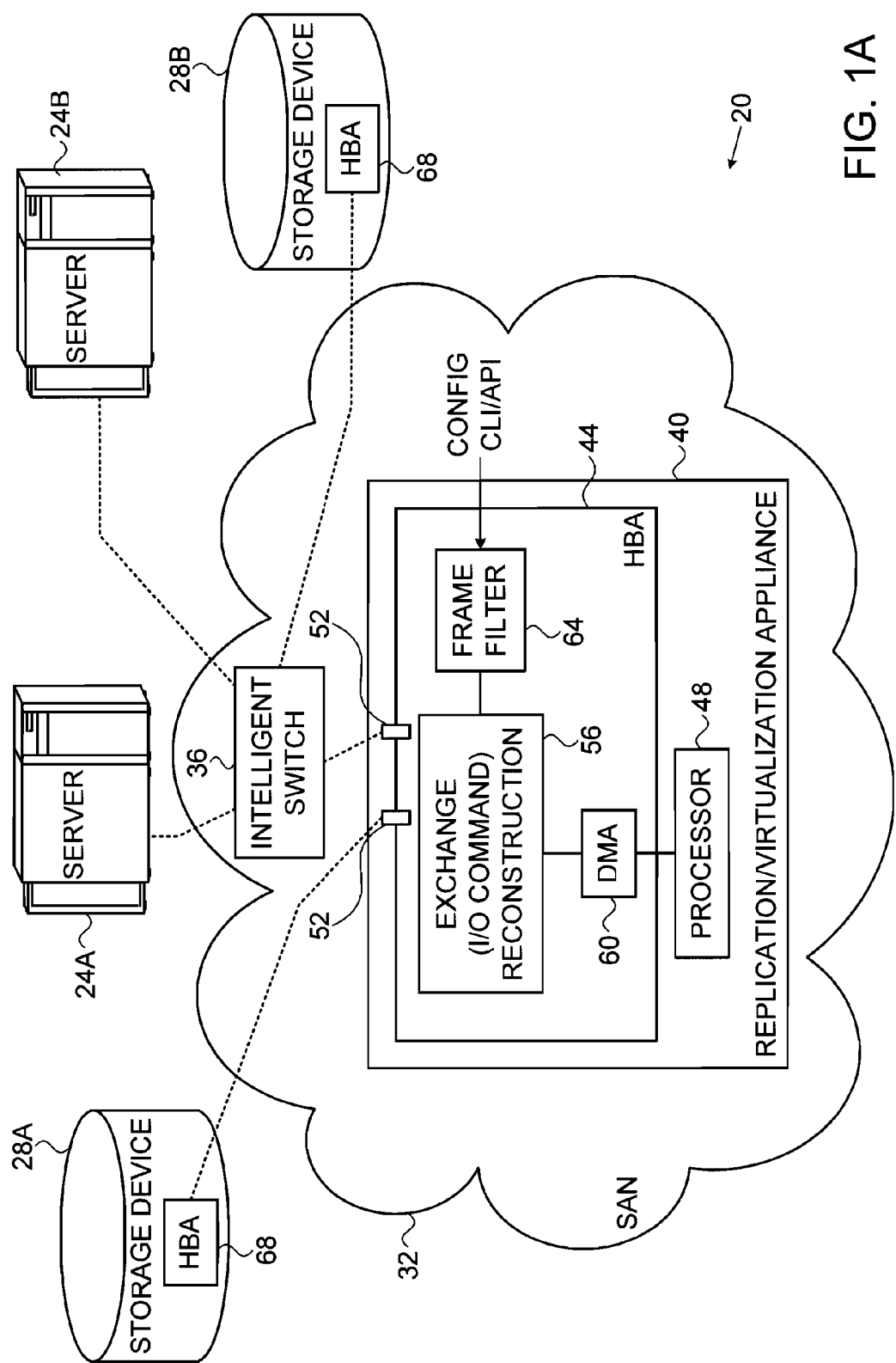
FIGS. 1A and 1B are block diagrams that schematically illustrate data storage systems, in accordance with embodiments of the present invention.

Embodiments of the present invention that are described herein provide improved methods and systems for data storage in intelligent storage networks. In an intelligent network, tasks such as replication (mirroring) and virtualization are carried out by network switches, network appliances or other network elements. The methods and systems described herein improve the performance of such networks by carrying out frame filtering in Host Bus Adapters (HBAs) of network appliances.

In some embodiments, a storage network accepts storage commands from one or more servers for execution in one or more storage devices. Each storage command is typically sent over the network using a respective sequence of communication frames that is referred to as an exchange. The network comprises a network appliance, which performs storage tasks such as replication or virtualization on some of the storage commands. The network further comprises a network switch that, among other functions, forwards communication frames to the network appliance. The switch may forward frames to the appliance using frame redirection or duplication.

The network appliance comprises a HBA and a processor, and possibly other elements such as a memory. The HBA typically handles the physical interface with the network, reassembles received communication frames into storage commands, and provides the reassembled storage commands to the processor. The processor applies the appropriate storage tasks (e.g., replication or virtualization) to the storage commands provided by the HBA.

In some embodiments of the present invention, the network switch is configured to forward communication frames to the network appliance indiscriminately, i.e., not necessarily only frames that are intended for processing by the appliance. The HBA of the network appliance is configured to filter the received frames, so as to retain only the frames corresponding to storage commands that are to be executed by the appliance. The retained frames are assembled by the HBA into storage commands and provided to the processor for execution. The frames that are filtered out by the HBA are discarded or sent back to the switch, without involving or loading the processor.

The frame filtering function of the appliance HBA enables considerable improvement in storage network performance. With this filtering, the switch can be relieved of the task of sending to the appliance only the frames that correspond to storage commands that are to be executed by the appliance. This sort of selective switching would typically require the switch to inspect and correlate each frame with the storage command to which it belongs, a task that opposes the stateless, frame-by-frame operation of most network switches. Adding frame filtering to the appliance HBA, on the other hand, does not add considerable processing, because the HBA operation is usually already stateful. Since the HBA reassembles frames into storage commands, it is inherently aware of the storage command to which each frame belongs.

Thus, the methods and systems described herein improve the network switch performance and simplify its operation considerably, while adding only negligible processing burden to the network appliance. As a result, the overall complexity of the storage network is significantly reduced, and its performance is improved.

System Description

FIG. 1A is a block diagram that schematically illustrates a data storage system 20, in accordance with an embodiment of the present invention. In system 20, one or more servers 24 store data in one or more storage devices 28 via a Storage Area Network (SAN) 32. The example of FIG. 1A shows two servers 24A and 24B and two storage devices 28A and 28B, for the sake of clarity. In alternative embodiments, system 20 may comprise any desired number of servers and storage devices.

Servers 24 store and retrieve data by sending storage commands, also referred to as Input/Output (I/O) commands, to storage devices 28. Storage commands may comprise, for example, write commands and read commands. In the embodiments described herein, SAN 32 operates in accordance with the Fibre Channel (FC) protocol, and servers 24 send to storage devices Small Computer System Interface (SCSI) commands over FC. In alternative embodiments, any other suitable storage standard or protocol can be used.

Each storage command is associated with one or more frame sequences that are referred to collectively as an exchange. A write command, for example, involves a frame sequence in one direction that carries the command and the data to be written, and an acknowledgement that is sent in the opposite direction. The entire bidirectional communication is regarded as the exchange that corresponds to the write command, and all the frames belonging to this exchange carry a unique exchange ID. The terms "storage command" and "exchange" (the sequences of frames corresponding to the storage command) are sometimes used interchangeably herein for the sake of clarity.

Some storage tasks in system 20 are carried out by network elements of SAN 32 rather than by servers 24 or storage devices 28. SAN 32 is therefore referred to as an intelligent network. Storage tasks that can be performed by elements of SAN 32 comprise, for example, replication (i.e., mirroring of data in two or more storage devices), storage virtualization (i.e., storage in physical storage devices that are managed by the SAN transparently to the servers), caching, and/or any other suitable task. Although the examples described below refer mainly to replication tasks, the disclosed techniques can be used for carrying out various other storage tasks, as well.

SAN 32 comprises an intelligent network switch 36 and a network appliance 40. Switch 36 accepts communication frames from servers 24 and forwards the frames to appliance 40, which in turn executes the storage commands in storage devices 28. In an example embodiment, switch 36 and appliance 40 together carry out data replication, i.e., mirror certain storage commands in two or more separate storage devices for protection.

In the example of FIG. 1A, switch 36 duplicates ("forks") the storage commands to be mirrored so as to produce two separate streams of frames. The switch sends one stream of frames for execution in storage device 28B, and sends the other stream of frames to appliance 40 for mirroring the storage commands in storage device 28A. Appliance 40 executes the storage commands received from switch 36 in storage device 28A (directly or indirectly, e.g., by forwarding storage commands to another appliance that executes them against the storage device). This configuration is referred to herein as "forking." An alternative configuration, in which appliance 40 handles the mirrored storage in both storage devices, is described in FIG. 1B below. Typically, each storage device 28 comprises a respective HBA for communicating with SAN 32.

Appliance 40 comprises a Host Bus Adapter (HBA) 44 and a processor 48. HBA 44 handles the physical interface of appliance 40 with SAN 32, e.g., translation between optical signals and communication frames, and also reassembles the frames accepted from switch 36 into storage commands. Processor 48 executes the reassembled storage commands in one or more of storage devices 28.

In some embodiments, HBA 44 comprises one or more ports 52 for receiving and transmitting frames. An exchange reconstruction module 56 reassembles the frames accepted from switch 36 into storage commands. In other words, module 56 associates each received frame with the storage command to which it belongs, so as to reproduce the exchanges produced by servers 24. In some embodiments, module 56 also associates each frame with the storage volume to which it applies. Module 56 may perform this association, for example, using a mapping between volumes, and Initiator IDs, target IDs and Logical Unit Numbers (LUNs), which is provided to the HBA. Module 56 provides the reassembled storage commands to processor 48 over a Direct Memory Access (DMA) interface 60.

In some embodiments, HBA 44 of appliance 40 comprises a frame filter 64. Filter 64 filters the frames that are received from switch 36, so as to retain only the frames corresponding to storage commands that are to be processed by the appliance. The frames that are filtered-out by filter 64, i.e., the frames that do not correspond to storage commands that are to be processed by the appliance, may be sent back from HBA 44 to switch 36. Alternatively, the filtered-out frames may be discarded. In either case, the filtered-out frames are processed by HBA 44 without involving or loading processor 48.

Frame filter 64 is typically configured using a suitable Command Line Interface (CLI) or Application Programming Interface (API) with the desired filtering scheme. The filtering scheme for frame filter 64 may be sent from processor 48 to HBA 44 using any suitable interface, such as over DMA interface 60 or over interface registers (not shown in the figure) between appliance 40 and HBA 44.

Frame filter 64 may filter frames according to any suitable filtering criteria that are defined over the corresponding storage commands. For example, filter 64 may retain storage commands that are directed to one or more particular storage volumes. The storage volumes in question may be defined, for example, by a SCSI nexus. As another example, filter 64 may retain storage commands that are of a particular type, e.g., retain only write commands or only read commands. As yet another example, filter 64 may combine the two above-described criteria, e.g., retain only commands of a certain type that are directed to a particular storage volume. As noted above, module 56 is aware of the command type and storage volume associated with each frame, and filter 64 may use this association for filtering the frames.

Because of the frame filtering performed in HBA 44 of appliance 40, switch 36 can be configured to send frames indiscriminately to appliance 40. (In the present context, the term "sending frames indiscriminately" means sending frames over a given path in the network regardless of the storage command to which the frames belong.) As such, switch 36 is relieved of the need to inspect the content of each frame, identify the storage command to which the frame belongs, and switch the frame according to the respective command. Implementing this sort of selective switching in switch 36 would be extremely computationally intensive and time consuming.

For example, in many protocols (e.g., in SCSI over FC) only the first frame in a given exchange indicates the command type and the applicable storage volume. Subsequent frames indicate only an identifier of the exchange (denoted Fully Qualified Exchange identifier—FQXID—in SCSI over FC). Selective switching in switch 36 would require the switch to maintain suitable data structures and processes for associating each frame with a respective exchange based on the exchange identifier, and then switching the frame accordingly. This sort of process would typically cause severe performance degradation in the switch, since most switches operate in a stateless, frame-by-frame manner that does not inspect the frame content.

Implementing exchange-based frame filtering in HBA 44, on the other hand, adds little or no computational load to the HBA. As noted above, HBA 44 reassembles the received frames into exchanges. Thus, the HBA inherently operates in a stateful manner that is aware of the exchange to which each frame belongs. Filtering frames based on exchange-based criteria in HBA 44 (e.g., based on command type or target volume) can use the exchange reassembly functionality of module 56, and therefore add little computational load, if any.

Figure 1B:
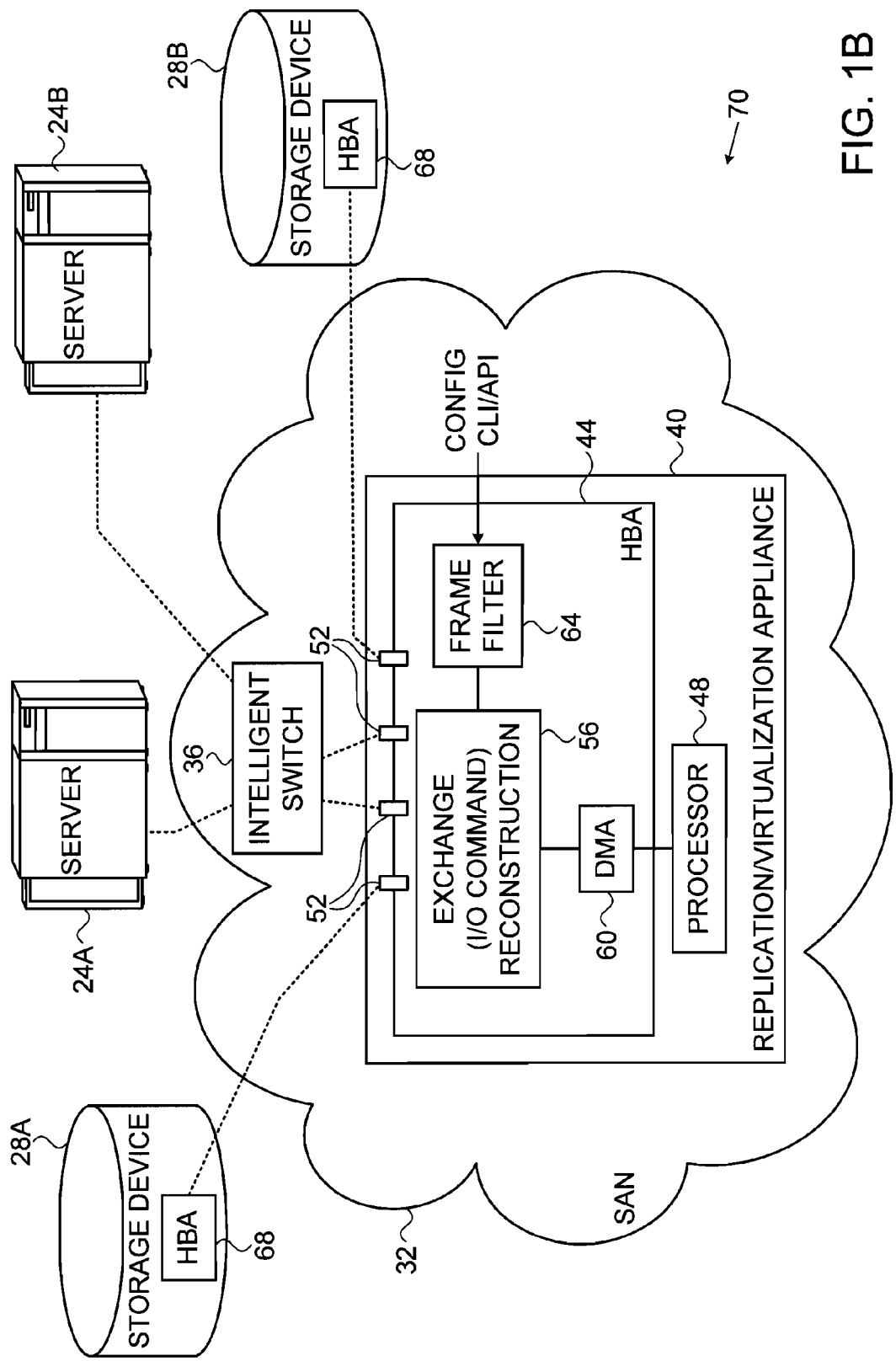

FIG. 1B is a block diagram that schematically illustrates a data storage system 70, in accordance with an alternative embodiment of the present invention. In this embodiment, intelligent switch 36 redirects the communication frames to appliance 40 (rather than duplicating the frames and sending one of the duplicated frame streams to the appliance as in FIG. 1A above). In the redirection configuration of FIG. 1B, HBA 44 of appliance 40 performs frame filtering as described above. Processor 48 replicates (mirrors) the retained storage commands, i.e., produces duplicated streams of frames and sends the streams to storage devices 28A and 28B, respectively. Filtered-out frames are sent back from HBA 44 to switch 36 without involving or loading processor 48.

As in the configuration of FIG. 1A above, switch 36 is typically configured to send the frames indiscriminately to appliance 40. Configuration of switch 36 can be performed using a suitable CLI or API. Unlike the scheme of FIG. 1A, in the configuration of FIG. 1B the switch redirects the frames to appliance 40 without duplicating them. Duplication is carried out in appliance 40.

Storage tasks such as mirroring can be performed using either the configuration of FIG. 1A or the configuration of FIG. 1B. The configuration of FIG. 1B is particularly suitable for implementing tasks such as storage virtualization, e.g., mapping of logical volumes specified in the storage commands to physical storage locations that are transparent to servers 24. Generally, however, any suitable storage task can be carried out in SAN 32 using either the "forking" scheme of FIG. 1A or the "redirection" scheme of FIG. 1B. Typically although not necessarily, in the "forking" configuration of FIG. 1A HBA 44 discards the filtered-out frames, and in the "redirection" configuration of FIG. 1B HBA 44 redirects the filtered-out frames back to switch 36.

The configuration of systems 20 and 70 in FIGS. 1A and 1B, and of system elements such as switch 36 and appliance 40, are example configurations that are chosen purely for the sake of conceptual clarity. In alternative embodiments, any other suitable configurations can also be used. The components of switch 36 and appliance 40 can be implemented is hardware, such as using one or more Field-Programmable Gate Arrays (FPGAs) or Application-Specific Integrated Circuits (ASIC). Alternatively, some components of switch 36 and appliance 40 can be implemented in software, or using a combination of hardware and software elements.

Typically, processor 48 of appliance 40 comprises a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

In some embodiments, HBA 44 of appliance 40 comprises multiple ports 52, e.g., two or four ports. In an embodiment, HBA 44 may receive frames from switch 36 over a given port, and redirect the filtered-out frames back to the switch over the same port. In an alternative embodiment, the HBA may receive frames from switch 36 on a given port, and redirect the filtered-out frames back to switch 36 over a different port. The latter implementation can be used, for example, when the load on the port used for receiving the frames is high.

In some embodiments, switch 36 does not change the metadata or World Wide Name (WWN) addresses of the frames when it redirects or forks the frames to appliance 40. In an example embodiment, switch 36 is configured so that the ports connecting the switch to servers 24 belong to one Virtual SAN (VSAN), and the ports connecting the switch to appliance 40 and to storage devices 28 belong to a different VSAN. In an alternative embodiment, switch 36 is configured so that the ports connecting the switch to servers 24 belong to one FC zone, and the ports connecting the switch to appliance 40 and to storage devices 28 belong to a different FC zone. When configuring the switch using different VSANs or different FC zones in this manner, the metadata and WWN addresses of the redirected or forked frames can typically remain unchanged. When metadata changes are needed, these changes are typically carried out by HBA 44.

Data Storage Method Description

Figure 2:
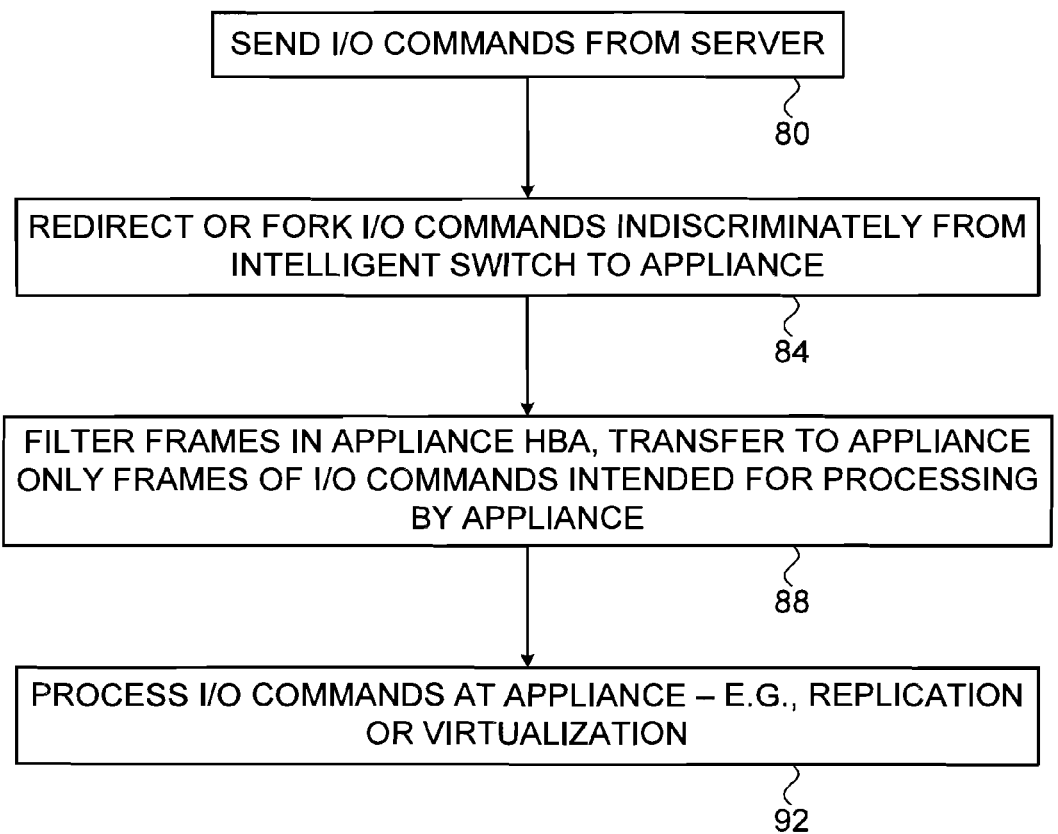
FIG. 2 is a flow chart that schematically illustrates a method for data storage, in accordance with an embodiment of the present invention.

FIG. 2 is a flow chart that schematically illustrates a method for data storage, in accordance with an embodiment of the present invention. The method begins with servers 24 sending storage commands for execution in storage devices 28, at a command input step 80. Each storage command comprises a sequence of frames referred to as an exchange. Network switch 36 sends (e.g., redirects or forks) the frames indiscriminately to appliance 40, at a switching step 84.

Filter 64 in HBA 44 of appliance 40 filters the received frames, at a filtering step 88. The filter retains only the frames corresponding to storage commands that are to be processed by the appliance. Typically, exchange reconstruction module 56 reassembles the received frames into storage commands, and filter 64 filters the frames based on a filtering criterion that is defined over the storage commands. The retained frames (reassembled into storage commands) are provided to processor 48 using DMA interface 60. The filtered-out frames are sent back from HBA 44 to switch 36, or discarded.

Processor 48 of appliance 40 processes the storage commands corresponding to the retained frames, at a command execution step 92. For example, processor 48 may perform data replication, virtualization, caching, or any other applicable storage task.

Example SCSI Over FC Implementation

When the storage commands are sent as SCSI commands over FC, the first frame in a given exchange (in a given frame sequence carrying a SCSI command) has the following FC header:

| Word | Bits: | | | |
|---|---|---|---|---|
| | 31-24 | 23-16 | 15-08 | 07-00 |
| 0 | R_CTL | | D_ID | |
| 1 | reserved | | S_ID | |
| 2 | TYPE | | F_CTL | |
| 3 | SEQ_ID | DF_CTL | SEQ_CNT | |
| 4 | OX_ID | | RX_ID | |
| 5 | RLTV_OFF | | | |

The FC header may be followed by a SCSI command payload, a data payload or other information. The S_ID and D_ID fields indicate the source and destination of the frame, respectively, typically corresponding to initiator and target WWNs. The OX_ID and RX_ID fields indicate a unique ID of the exchange to which this frame belongs, as assigned by the initiator and the receiver, respectively. (The unique ID appears twice since the initiator and receiver may mark the frame by a different unique ID.) These fields are defined when the command is first transmitted and acknowledged. All subsequent frames of the command indicate the same values in these fields.

A command payload that follows the above-described header in the frame typically has the following format:

| Field Name | Description | Size |
|---|---|---|
| FCP_LUN | Logical Unit Number | 8 bytes |
| FCP_CNTL | Control Field | 4 bytes |
| FCP_CDB | SCSI Command Descriptor Block | 16 bytes |
| FCP_DL | Data Length | 4 bytes |

The FCP_LUN field gives the Logical Unit Number addressed by the command (the WWN is given in the basic frame header), and the FCP_CDB indicates the command itself.

Subsequent data frames in this exchange typically comprise exchange identifiers (e.g., D_ID, S_ID, OX_ID or RX_ID), but not the command type or applicable storage volume. These identifiers are referred to collectively as a Fully Qualified Exchange ID (FQXID). In order to reassemble the SCSI command and its data and associate them with a single exchange, module 56 in HBA 44 may look-up the first frame in the exchange using the FQXID. Module 56 typically extracts the command type and target storage volume from the first frame in the exchange. In some embodiments, filter 64 in HBA 44 applies the above-described filtering criteria based on the command type and storage volume information that are obtained by module 56 from the first frame of the exchange.

The following table gives the header fields that can be used by HBA 44 to reassemble the frames of a given exchange:

| Condition | D_ID | S_ID | OX_ID | RX_ID |
|---|---|---|---|---|
| Basic operation, initiator identification | R | R | R | |
| Basic operation, target identification | R | R | R | R |

Although the embodiments described herein mainly address execution of storage tasks using HBAs of network appliances, the methods and systems described herein can also be used in other applications, such as for implementing a store-and-forward network or replication scheme using HBAs 68 that are installed on the storage devices. In such schemes, all frames that do not belong to a particular storage device are forwarded/forked by the storage device's HBA to the next storage device.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A network appliance, comprising:
a processor, which is configured to execute storage commands in one or more storage devices; and
a Host Bus Adapter (HBA), which is configured to receive from a network switch over a network communication frames from one or more applications and to offload the processor by:
reassembling sequences of the communication frames so as to produce respective exchanges that specify the storage commands;
distinguishing between first exchanges corresponding to first storage commands that are intended for processing by the network appliance, and second exchanges corresponding to second storage commands that are not intended for processing by the network appliance, by identifying a first frame of each sequence of the communication frames, extracting from the first frame one or more attributes that are specified only in the first frame, and applying to the extracted attributes a filtering criterion that is defined over the attributes; and
forwarding only the first exchanges, and not the second exchanges, from the HBA to the processor, so as to cause the processor to execute the first storage commands specified by the first exchanges, and redirecting back to the network switch the communication frames that are not passed through to the processor.

2. The network appliance according to claim 1, wherein the HBA is configured to distinguish between the first exchanges and the second exchanges based on a type of the storage command and a storage volume to which the storage command is applied.

3. The network appliance according to claim 1, wherein the processor is configured to accept the filtering criterion for distinguishing between the first and second exchanges over a Command Line Interface (CLI) or Graphical User Interface (GUI), and to forward the filtering criterion to the HBA.

4. The network appliance according to claim 1, wherein the HBA is configured to receive the communication frames over a given port, and to redirect the communication frames back to the network switch over the given port.

5. The network appliance according to claim 1, wherein the HBA is configured to receive the communication frames over a first port, and to redirect the communication frames back to the network switch over a second port that is different from the first port.

6. A storage method, comprising:
in a network appliance that includes a Host Bus Adapter (HBA) and a processor, receiving from a network switch over a network communication frames from one or more applications;
reassembling, by the HBA, sequences of the communication frames so as to produce respective exchanges that specify storage commands to be executed in one or more storage devices;
distinguishing, by the HBA, between first exchanges corresponding to first storage commands that are intended for processing by the network appliance, and second exchanges corresponding to second storage commands that are not intended for processing by the network appliance, by identifying a first frame of each sequence of the communication frames, extracting from the first frame one or more attributes that are specified only in the first frame, and applying to the extracted attributes a filtering criterion that is defined over the attributes;
offloading the processor by forwarding only the first exchanges, and not the second exchanges, from the HBA to the processor; and
executing, using the processor, the first storage commands specified by the first exchanges that were forwarded by the HBA, and redirecting back to the network switch the communication frames that are not passed through to the processor.

7. The method according to claim 6, wherein the attributes of a storage command comprise at least one parameter selected from a group of parameters consisting of a type of the storage command and a storage volume to which the storage command is applied.

8. The method according to claim 6, wherein distinguishing between the first exchanges and the second exchanges comprises accepting the filtering criterion in the network appliance over a Command Line Interface (CLI) or Graphical User Interface (GUI), and forwarding the filtering criterion to the HBA.

9. The method according to claim 6, wherein receiving the communication frames comprises accepting the communication frames over a given port, and wherein redirecting the communication frames comprises sending the redirected communication frames back to the network switch over the given port.

10. The method according to claim 6, wherein receiving the communication frames comprises accepting the communication frames over a first port, and wherein redirecting the communication frames comprises sending the redirected communication frames back to the network switch over a second port that is different from the first port.

11. A storage network, comprising:
a network switch, which is configured to receive from one or more applications communication frames that convey storage commands for execution in one or more storage devices, and to forward the communication frames irrespective of the storage commands to which the frames belong; and
a network appliance, comprising:
a processor, which is configured to execute the storage commands in the one or more storage devices; and a Host Bus Adapter (HBA), which is configured to receive the communication frames from the network switch, and to offload the processor by:
- reassembling sequences of the communication frames so as to produce respective exchanges that specify the storage commands;
- distinguishing between first exchanges corresponding to first storage commands that are intended for processing by the network appliance, and second exchanges corresponding to second storage commands that are not intended for processing by the network appliance, by identifying a first frame of each sequence of the communication frames, extracting from the first frame one or more attributes that are specified only in the first frame, and applying to the extracted attributes a filtering criterion that is defined over the attributes; and
- forwarding only the first exchanges, and not the second exchanges, from the HBA to the processor, so as to cause the processor to execute the first storage commands specified by the first exchanges, and redirecting back to the network switch the communication frames that are not passed through to the processor.

12. The storage network according to claim 11, wherein the network switch is configured to redirect the communication frames to the network appliance.

13. The storage network according to claim 11, wherein the network switch is configured to duplicate the communication frames so as to produce first and second streams of the communication frames, to send the first stream for execution in one of the storage devices and to send the second stream to the network appliance for execution in another of the storage devices.

14. A storage method, comprising:
- in a network switch, receiving from one or more applications communication frames that convey storage commands for execution in one or more storage devices, and forwarding the communication frames irrespective of the storage commands to which the frames belong;
- receiving the forwarded communication frames in a network appliance that includes a Host Bus Adapter (HBA) and a processor;
- reassembling, by the HBA of the network appliance, sequences of the communication frames so as to produce respective exchanges that specify storage commands to be executed in the one or more storage devices;
- distinguishing, by the HBA, between first exchanges corresponding to first storage commands that are intended for processing by the network appliance, and second exchanges corresponding to second storage commands that are not intended for processing by the network appliance, by identifying a first frame of each sequence of the communication frames, extracting from the first frame one or more attributes that are specified only in the first frame, and applying to the extracted attributes a filtering criterion that is defined over the attributes;
- offloading the processor of the network appliance by forwarding only the first exchanges, and not the second exchanges, from the HBA to the processor; and
- executing, using the processor, the first storage commands specified by the first exchanges that were forwarded by the HBA, and redirecting back to the network switch the communication frames that are not passed through to the processor.

15. The method according to claim 14, wherein forwarding the communication frames comprises redirecting the communication frames to the network appliance.

16. The method according to claim 14, wherein forwarding the communication frames comprises duplicating the communication frames so as to produce first and second streams of the communication frames, sending the first stream for execution in one of the storage devices, and sending the second stream to the network appliance for execution in another of the storage devices.

* * * * *